(12) United States Patent
Bräker et al.

(10) Patent No.: US 8,622,607 B2
(45) Date of Patent: Jan. 7, 2014

(54) SHEARING/MIXING TOOL (75) Inventors: Willy Bräker, Wil (CH); Martin Hartsieker, Bad Oeynhausen (DE); Danijel Dolic, Niederuzwil (CH); Peter Braum, Kreuzlingen (CH)

(73) Assignee: Bühler AG, Uzwil (CH)

( * ) Notice: Subject to any disclaimer, the term of this patent is extended or adjusted under 35 U.S.C. 154(b) by 0 days.

(21) Appl. No.: 13/265,839

(22) PCT Filed: Apr. 22, 2010

(86) PCT No.: PCT/EP2010/055323
§ 371 (c)(1),
(2), (4) Date: Nov. 8, 2011

(87) PCT Pub. No.: WO2010/122092
PCT Pub. Date: Oct. 28, 2010

(65) Prior Publication Data
US 2012/0113742 A1 May 10, 2012

(30) Foreign Application Priority Data
Apr. 22, 2009 (DE) .......... 10 2009 018 178

(51) Int. Cl.
*B01F 13/00* (2006.01)
*B01F 7/00* (2006.01)

(52) U.S. Cl.
USPC ............................. 366/343; 366/279

(58) Field of Classification Search
USPC ................. 366/317, 343, 342, 241
See application file for complete search history.

(56) References Cited

U.S. PATENT DOCUMENTS

| 19,783 | A | * | 3/1858 | Mihan | 15/431 |
| 267,491 | A | * | 11/1882 | Carley | 366/342 |
| 1,459,148 | A | | 6/1923 | Flynt | |
| 1,966,352 | A | * | 7/1934 | Mahony | 366/343 |
| 3,434,804 | A | * | 3/1969 | Winn | 366/168.1 |
| 4,534,657 | A | * | 8/1985 | Clement | 366/265 |
| 4,767,214 | A | | 8/1988 | Fischer | |
| 5,055,273 | A | * | 10/1991 | Wilhelm et al. | 366/312 |
| 5,494,352 | A | * | 2/1996 | L'Estrange, Jr. | 366/343 |
| 2007/0286017 | A1 | | 12/2007 | Wong | |

FOREIGN PATENT DOCUMENTS

| BE | 888969 A1 | 9/1981 |
| DE | 1082576 | 6/1960 |
| DE | 1276986 | 9/1968 |
| DE | 3020086 A1 | 12/1980 |

(Continued)

OTHER PUBLICATIONS

SpongeBob Squarepants Episode 1 "Help Wanted" Air Date 1999.*

*Primary Examiner* — Tony G Soohoo
*Assistant Examiner* — Anshu Bhatia
(74) *Attorney, Agent, or Firm* — Shoemaker and Mattare (57) ABSTRACT

A shearing/mixing tool (20) is one of several tools that is preferably mounted on a shaft (2). On both sides, the shaft (2) is rotatably mounted on the end walls of a horizontal drum. The tool (20) has at least one opening (25). Preferably, the shearing/mixing tools (1) are shearing/throwing blades (23) which are formed in a sickle-shaped manner at the end of stirring arms and rotate in the drum at an angle from the transverse axis of the shaft axis in such a way that the tip of the sickle or the spoon-shaped end of the blade (23) is the leading part. The shearing/throwing blade is arranged on an arm (22) made from a web plate that is bent in a Y-shaped manner.

7 Claims, 8 Drawing Sheets

(56) References Cited

FOREIGN PATENT DOCUMENTS

| DE | 4344995 | 7/1995 |
| DE | 19636989 | 4/1997 |
| DE | 19835347 A1 | 2/2000 |
| DE | 10 2004 034 371 | 12/2005 |
| EP | 1302238 A1 | 4/2003 |
| GB | 702175 | 1/1954 |
| JP | 11235522 A | 8/1999 |

* cited by examiner

SHEARING/MIXING TOOL

The invention is based on known mixing tools and known shearing tools, which are fastened to a shaft, wherein the shaft is mounted rotatably in an at least partially cylindrical trough, and the mixing tools end at a very short distance from an inner surface of the trough and the shaft has driving means.

Mixing tools of this type and shearing tools of this type have been known for decades and are generally used in substantially horizontally oriented troughs in order to mix any type of bulk materials and liquid masses or to subject them to a shearing treatment. This overall manner of operation has proven extremely favorable for the treatment of chocolate, compound and filling masses.

The prior art for mixing tools are plowshare blades, as disclosed by DE-C 1276986. Mixing tools of this type are arranged in a drum in such a manner that product cannot be distributed in the gap between the mixing tool and the inner surface of the drum. This is achieved at the mixing tool by means of a clearance angle which opens counter to the revolving direction of the spinning machine. In order to meet this stipulation, the bottom wall of the mixing tool can be set back, or it is correspondingly beveled or the mixing tool itself is positioned obliquely and therefore the mixing tool obtains a cleaning function scraping off the inner wall of the drum. This does not have an effect on pure mixing tools because the actual mixing action which the tools have to carry out is not impaired as a result.

The prior art for mixing tools also includes throwing blades. Mixing tools of this type are blades which are sickle-shaped, are positioned obliquely with respect to the transverse axis of the shaft axis, and are rectilinear, and blades which are flat and sheet-like, with a distance which is continuously uniformly as small as possible from the inner wall of the drum, wherein the blade edge closest to the inner wall of the drum logically has to be an elliptical curve.

These mixing tools are arranged in a drum in such a manner that the product is neither drawn in, pressed or sheared in the gap between the mixing tool and the inner surface of the drum, but rather is pushed ahead by the mixer, nor can any wedging action whatsoever take place. In other words: a shearing gap is not formed and therefore only small restructurings of the material can take place.

Shearing tools which, in turn, are intended to have more of a shearing effect than a mixing effect are also known. Said tools, over the entire length thereof, as seen in the revolving direction of the tools, are at a greater distance from the inner surface of the trough continuously in the front region than continuously in the rear region, which causes an action drawing in the material. However, these tools have a small mixing action.

Furthermore, DE-A-4344995 has disclosed a construction which improves a mixing tool, such as a known plowshare blade, to the effect that, in addition to the mixing operation, restructurings of the material are also promoted. For this purpose, the mixing tool or the mixing tools, as seen in the revolving direction of the mixing tools, is/are spaced apart further from the inner surface of the drum in the front region than in the rear region.

With the intended products, this results in a considerable wedging of the product, and the product, once caught in the gap, and in particular assisted by the shearing surface which becomes larger as the gap becomes narrower, can scarcely escape any more from being compressed when subjected to excessive stress, which may result, in the case of suspensions, to a grinding effect on the solids. The excess friction produced as a result may result in local overheating of the product, which may be undesirable.

GB 702,175 A discloses a mixer in which the tips of the mixing tool blades, which are designed in the form of double-sided plowshare blades, are located at the front, as seen in the revolving direction, and scrape material which is to be mixed off the inner walls of the trough.

DE 1 082 576 A describes a counterflow mixing mechanism, in which stirring blades are arranged at an angle on supporting arms. The supporting arms are configured in a manner similar to a sword and are positioned at an angle to the axis of the stirring mechanism shaft in such a manner that the conveying direction of the supporting arm surface is opposed to the conveying direction of the stirring blades.

A further shearing and mixing tool is disclosed in DE A 19636989, which is characterized by a. the shearing/mixing tool has at least one sickle-shaped and spoon-shaped shearing/throwing blade on a radial outer side of the tool carrier,
b. the shearing/throwing blade is curved, as seen from the sickle tip thereof to the end thereof, in an arcuate manner with respect to the longitudinal axis of the shearing/throwing blade with a bending angle ($\alpha$), wherein
c. the tangents to the peripheral outer surface of the shearing/throwing blade and to the inner surface of the trough enclose a further angle ($\gamma$), and therefore the distance between the inner surface of the trough and the peripheral outer surface of the shearing/throwing blade increases, as seen from the sickle tip, and wherein
d. the longitudinal axis of the shearing/throwing blade forms a pitch angle ($\beta$) with respect to the axis of the shaft, and
e. on the shearing/throwing blade, the spoon-shaped part faces in the direction of rotation and the sickle-shaped tip faces in the opposite direction to the direction of rotation.

It is the object of the present invention to improve a mixing tool, such as a known throwing blade, to the effect that, in addition to the mixing operation, restructurings of the material in the product to be treated are also promoted (shearing tool), and in the same step, in addition to the shearing operation, a considerable mixing action can also be obtained.

An important aim of the improvement here, along with optimum mixing power, is to bring about restructuring of the material in a manner which still takes care of the product and is nevertheless highly efficient, and to design the tool in such a manner that, with product rheology, structure and consistency changing over the process time, at least one optimally designed shearing gap section, which is matched to the time-dependent structure of the product, is always available as part of the entire length of the shearing gap. Furthermore, the product is not intended to undergo any local overheating, nor in the case of suspensions is a grinding effect, acting on the solids, intended to arise.

According to the invention, this object is achieved, in particular by developing the tool according to DE-A-19636989, by a shearing/mixing tool which is arrangeable on a shaft which is mounted coaxially and rotatably in an at least partially cylindrical trough (3). The shearing/mixing tool then forms a rotor arrangement with the shaft via a tool carrier. The shearing/mixing tool comprises a shearing/throwing blade and at least one arm which is rectilinear, positioned obliquely and/or is bent.

The shearing/throwing blade may be planar or curved, it may be sickle-shaped or be in the form of a plate. The latter may have, for example, a polygonal, rectangular or trapezoidal outer contour.

The arm or arms can be designed to be fittable on a tool carrier or to be integral therewith. The tool carrier, for its part, can be fastened on the shaft. It may be designed as an annular fastening element which is suitable in particular to be mountable on a shaft having a round cross section.

A plurality of shearing/mixing tools may also be fitted on a shaft, or at least one shearing/mixing tool can be fitted together with one or more further tools, for example, a wall scraper, on a shaft.

The tool has at least one opening.

Tests have shown that the hole in the tool has additional positive technological properties, better fluidization in the dry phase and an additional reaction surface on the product veil in the liquid phase, in particular in a conching and liquefying process. The tool also affords additional advantages in the mixing process, for example better mixing of the components.

In a preferred embodiment of the invention, at least one opening is provided in an arm, between the arms and/or between the arm and shearing/throwing blade. In the last-mentioned case, the opening is bounded on one side by the arm and on the other side by the shearing/throwing blade.

At least some of the portion of the mass to be processed that does not pass between the shearing/throwing blade and inner wall of the trough during rotation of the tool, but rather remains within the shearing/throwing blade, is guided through the opening and, upon passing through, undergoes processing, in particular shearing, expansion and/or mixing.

In this case, the processing of the mass per revolution is therefore intensified, since the throughput of the mass to be processed is increased.

The greater the distance of the opening from the shaft, the greater is the speed through the opening and the more intensive is the processing. The opening is therefore preferably arranged in that region of the arm which is furthest away radially from the axis.

In a preferred embodiment of the invention, at least one opening is provided in the shearing/throwing blade.

Also in this case, at least part of that part of the mass to be processed that does not pass between the shearing/mixing tool and inner wall of the trough during the rotation of the tool, but rather remains, as viewed radially, within the shearing/throwing blade, is guided through the opening and is thus subject to processing.

On the other hand, however, at least a portion of the mass which passes into the gap between the shearing/mixing tool and inner wall of the trough can also escape again from said gap through the opening. In this case, the mass is less severely squeezed or sheared and undergoes a more gentle treatment.

Either one or the other effect predominates depending on how the shape of the tool is designed, for example, depending on the inclination of the shearing/throwing blade, or depending on the gap distance or depending on the profile of the gap distance between the shearing/mixing tool and inner wall of the trough, and depending on the direction of rotation of the tool.

The tool may therefore also be rotated initially in one direction and then in the other direction and the mass initially intensively treated, then gently treated, or vice versa.

The tool may be designed in such a manner that, on the one hand, it acts as a wall scraper and, on the other hand, it simultaneously or subsequently, for example during a reversal of the direction of rotation, processes the mass, in particular shears, expands and/or mixes the mass.

The opening may have any geometry. It is preferably polygonal, in particular triangular, and/or rounded. If the opening is provided in the blade, the outer contour preferably substantially follows the contour of the blade. In the case of a triangular blade surface, the opening surface is therefore substantially likewise triangular.

If the arm is of bent design, at least one limb of said arm is preferably arranged at right angles to the shaft axis. During the rotation of the tool, said limb collects material and feeds the material to the opening.

A hole located in a bent arm is preferably arranged in the bend where mass to be processed collects if the tool rotates in the direction of the opening angle of the bend.

In an advantageous embodiment of the invention, the cross-sectional area is contracted and/or enlarged in and/or counter to the direction of rotation, and therefore the inlet and outlet surfaces of at least one opening preferably differ in size.

If the material thickness is sufficiently large, the cross-sectional area of the opening changes in such a manner that the opening has the shape of a narrowing or widening funnel and an expanding or shearing flow of the material within the opening occurs, depending on the direction of rotation.

The cross-sectional area may also initially narrow then widen again, or vice versa.

The tool may have an opening in the arm region and an additional opening in the blade. A plurality of openings may also be provided in the blade. The processing of the mass is more intensive or less intensive depending on the cross-sectional area of the particular opening and depending on the sum of the cross-sectional areas.

In an advantageous embodiment of the invention, the shearing/mixing tool according to the invention has an opening which is suitable for receiving an insert. The insert may have no opening or at least one opening. The user can preferably make a choice from a selection of different inserts and equip the tool in such a manner that it is particularly suitable for certain masses to be processed and/or for certain processing operations.

As an alternative, the user may make a selection from tools which differ in the arrangement, design and/or number of openings and which the user fits onto the shaft depending on the mass to be processed and/or for the processing operation.

The shearing/mixing tool according to the invention preferably has a shearing/throwing blade which is sickle-shaped, and is preferably curved in the shape of an arc of a circle in cross section and is preferably rectilinear in the longitudinal direction and rotates at an angle of 1-45° obliquely with respect to the shaft axis in the drum, wherein the bending angle in the cross section of the shearing/throwing blade preferably increases in size from the sickle tip to the rear, and therefore the shearing/throwing blade forms an inverted spoon-shaped surface to the rear virtually parallel to the inner surface of the trough and therefore, as the bending angle increases, the distance of the shearing/throwing blade periphery from the inner wall of the trough becomes ever larger (angle $\gamma$), for example to more than 50 mm.

The minimum distance from the inner wall of the trough is 0.1-1 mm, depending on the mass to be processed and depending on the processing step.

The gap between the tool and inner wall of the trough preferably has a width of 1-3 mm if the tool is intended to operate in a wall-stripping manner. For a shearing treatment of the mass to be processed, the gap between the tool edge and inner wall of the trough preferably has a width of approximately 5-30 mm.

The shearing/mixing tool, which is connected frictionally to the drive shaft via an arm, preferably has at least one further arm which is provided with a wall scraper acting in the direction of rotation.

It goes without saying that, according to the described geometrical shape of the shearing/throwing blade for the optimum treatment of a very wide variety of products, as the bending angle becomes larger, the bending radius can simultaneously also be increased or reduced, and also that the transverse bending may be a curve which has a regressive or else progressive profile, depending on the product, and that the shearing/throwing blade, in addition to the transverse bending, can be bent in the longitudinal direction from the sickle tip toward the left or right side wall and, as seen in top view, with an angle δ being formed between the tangent to the bend and the longitudinal axis of the extent of the tool.

It also goes without saying that, for a desired action, depending on the product, the wall scraper which is attached to the further arm can likewise be designed as a throwing blade which is sickle-shaped, but is flat, i.e. is not curved in cross section, is rectilinear in the longitudinal direction or is curved toward the left or right side wall, with a consistent minimum distance from the inner wall of the trough.

Accordingly, the shearing/mixing tools according to the invention are preferably used in conching machines for conching chocolate masses and in liquefying or mixing machines of compound and filling masses in the confectionary industry.

As is known, efficient conching machines are distinguished in that one and the same machine optimally carries out a plurality of basic process operations, such as mixing, shearing and ventilating, in one working step. In the case of chocolate masses, the restructuring of the pulverulent material being rolled into a flowable suspension can therefore be carried out efficiently and at the same time the chocolate masses can be deacidified without suffering aroma losses, caused by local overheating as a consequence of excessive friction of the product.

Further advantages and exemplary embodiments emerge from the description and the attached drawing. The individual figures of the drawings show the shearing/mixing tool partially in a highly schematized manner and should be understood as not being to scale, wherein the different embodiments should be understood as not being a conclusive list but rather as being by way of example. In the drawings.

Figure 1:
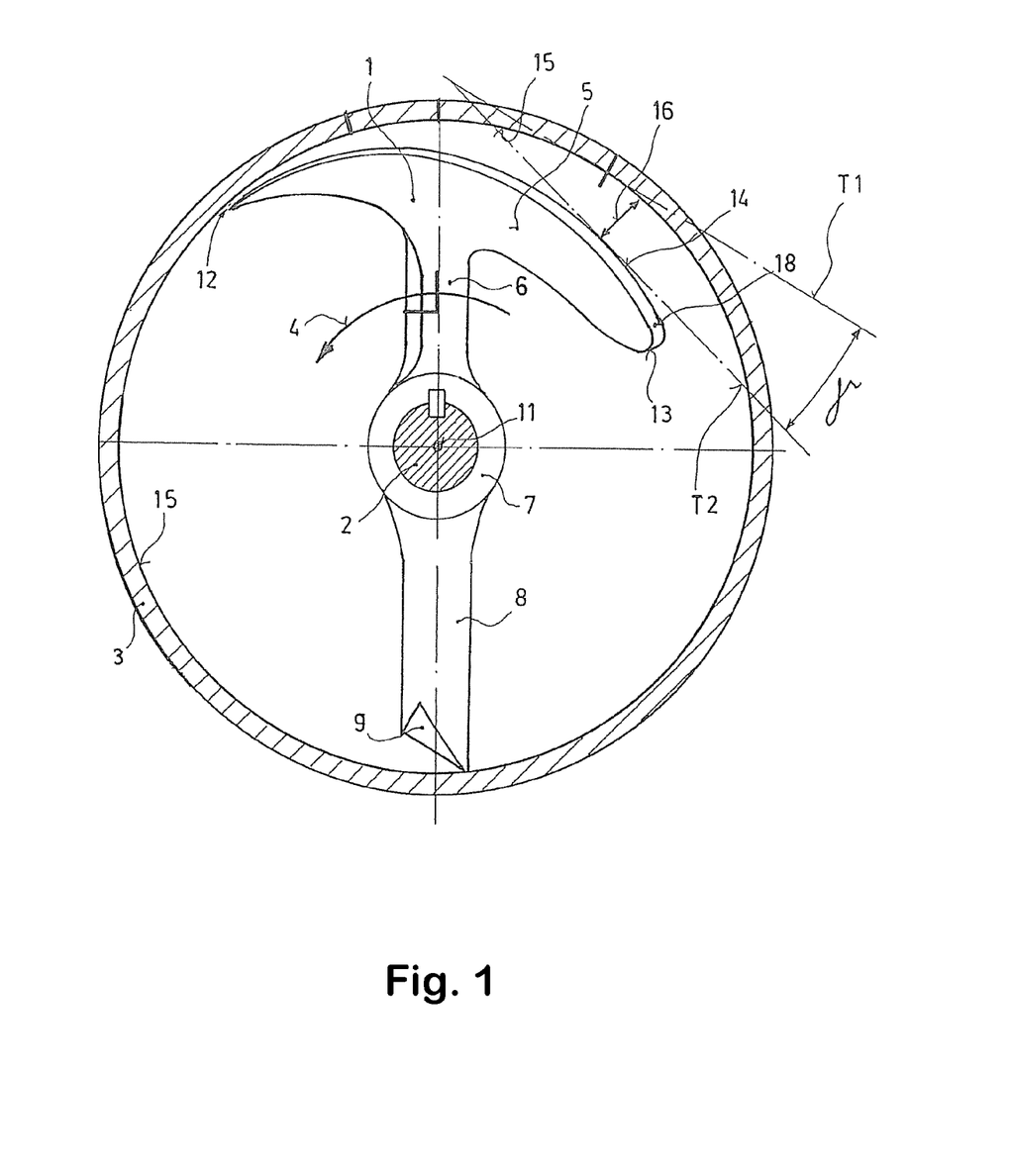
FIG. 1 shows a shearing/mixing tool according to DE-A-19636989 with a shearing/throwing blade which is rectilinear in the longitudinal direction, is curved in the shape of an arc of a circle in cross section with a bending angle increasing from the sickle tip toward the inverted spoon-shaped end, and with the shearing/throwing blade periphery being at a distance from the inner wall of the trough with respect to a drum, the distance increasing away from the sickle tip.

FIG. 1 shows, in a side view and in section, a previously known shearing/mixing tool 1 in a manner in which it is fastened frictionally on a shaft 2 and in which the shaft 2 is arranged together with the shearing/mixing tool 1 in a trough 3. A plurality of shearing/mixing tools 1 on the shaft 2 form a shearing/mixing rotor. The direction of rotation of the shearing/mixing rotor is indicated by the arrow direction 4. The tool arrangement is composed of the shearing/mixing tool 1 with a shearing/throwing blade 5 on one arm 6 and with a fastening ring 7 and a further, opposite arm 8 having a wall scraper 9. The arm 6 together with the fastening ring 7 and the counter arm 8 is either fastened releasably to the shaft 2 (tongue and groove), or the arm 6 together with the fastening ring 7 and the counter arm 8 is welded to the shaft 2.

Figure 2:
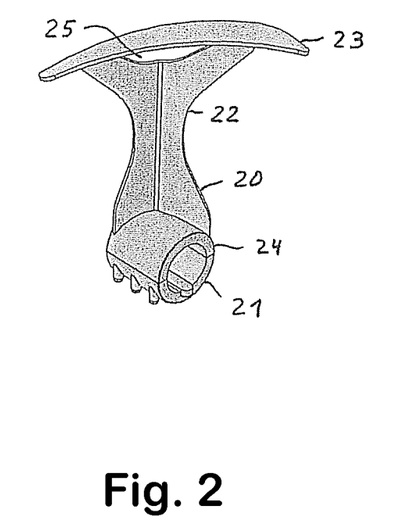
FIG. 2 shows a first embodiment of a shearing/mixing tool according to the invention.
Figure 3:
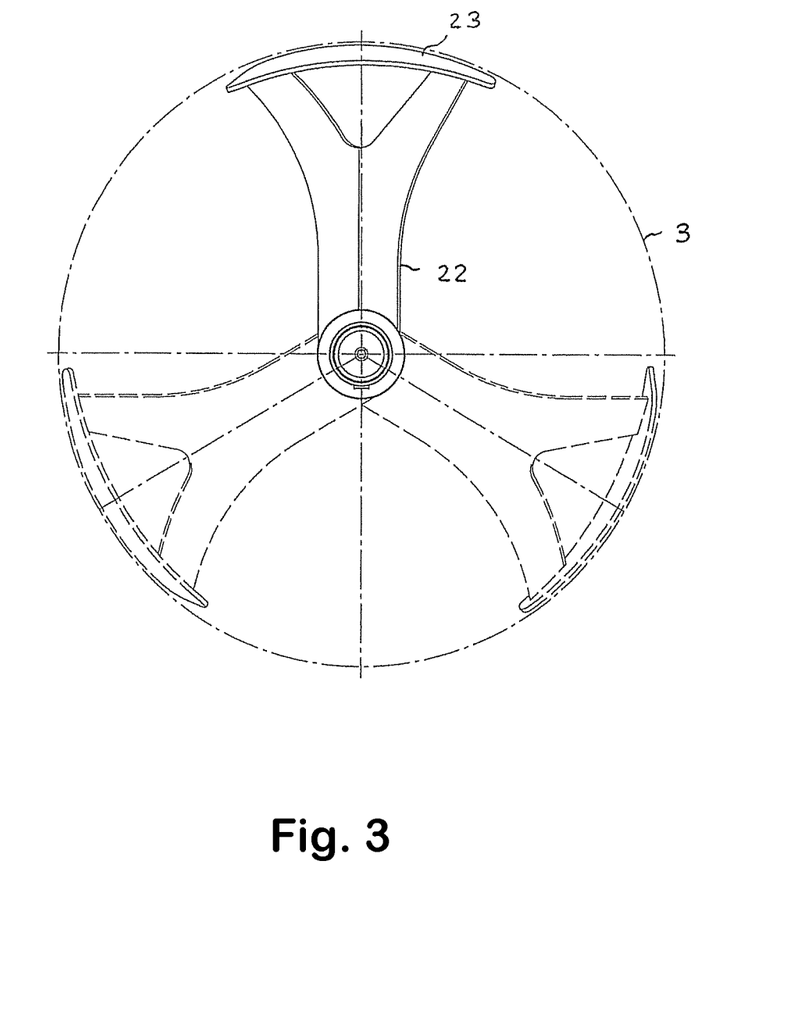
FIG. 3 shows the shearing/mixing tool according to the invention in a different illustration.

The shearing/mixing tool 20 according to the invention is fastened frictionally and in a form-fitting manner on a shaft 2 by means of a fastening ring 21. One arm 22 is connected to a shearing/throwing blade 23. The shearing/throwing blade 23, like the arm 22, is composed of bent steel plate. The blade 23 is composed of a bent metal plate and is positioned at approx. 15°. The outer edge of the blade is arranged virtually parallel to the trough. The arm 22 is a Y-shaped web plate which is turned on edge and is welded perpendicularly or at an angle onto a half ring 24 of the fastening ring 21.

A triangular opening 25 is left free between the webs of the arm 22. The sheet-metal construction permits a significant reduction in weight in comparison to the embodiment illustrated in FIG. 1. The opening 25 is preferably in the shape of an equilateral triangle.

In the exemplary embodiment, the arm 22 is bent and positioned obliquely (FIG. 2).

Instead of a welded sheet-metal construction, cast embodiments are also possible.

Although the tool above is described in conjunction with a completely cylindrical conch trough designed as a drum, it goes without saying that the invention can be used with the same advantages in partially cylindrical compartments in conch troughs having more than one conching shaft, like the ones which are known per se.

Figure 4:
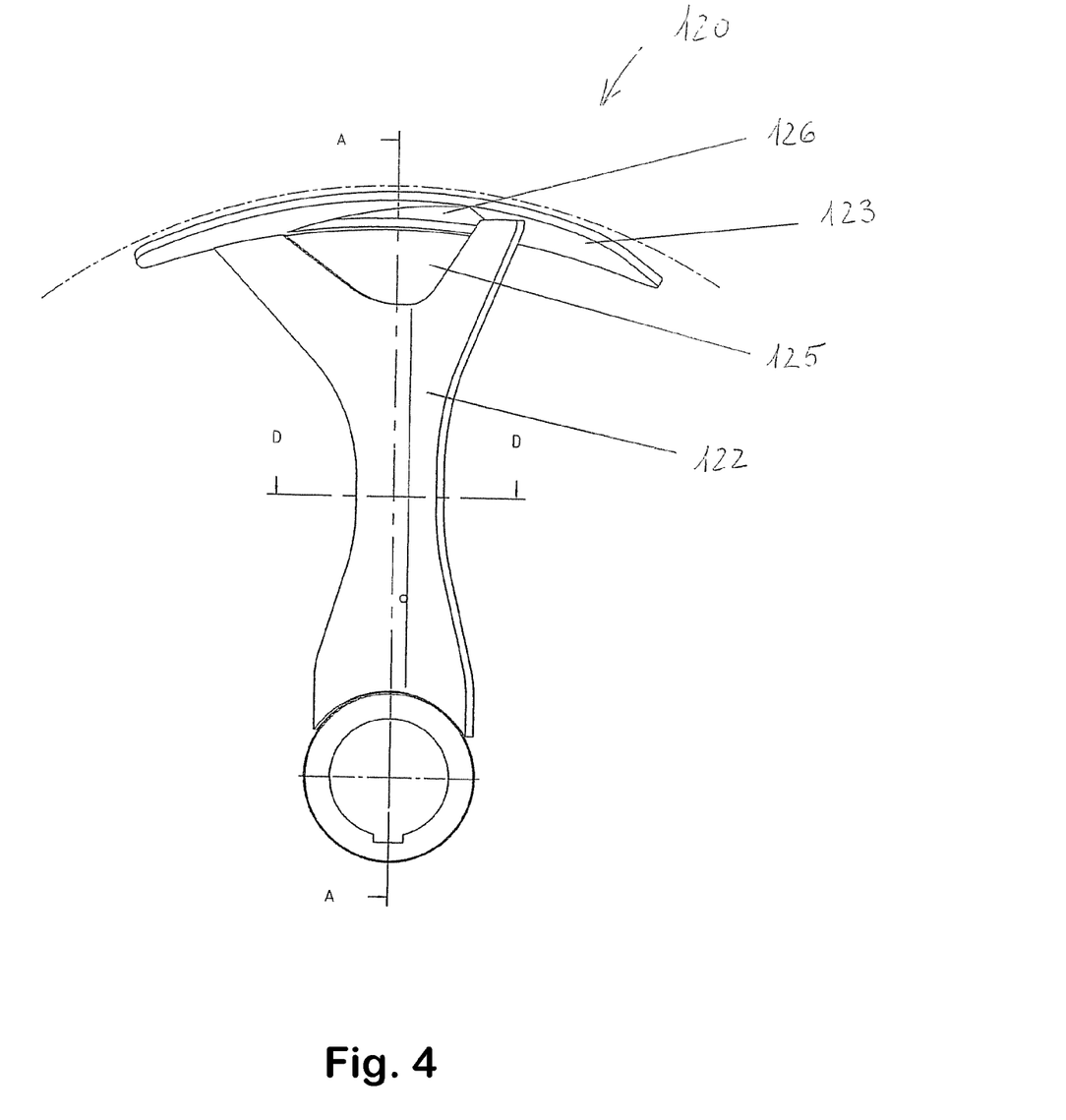
FIG. 4 shows a second embodiment of the shearing/mixing tool according to the invention in a lateral view.

FIG. 4 shows a second embodiment of the shearing/mixing tool 120 according to the invention in a lateral view. In addition to a first opening 125 in the arm 122 of the tool 120, there is a second opening 126 in the shearing/throwing blade 123.

Figure 5:
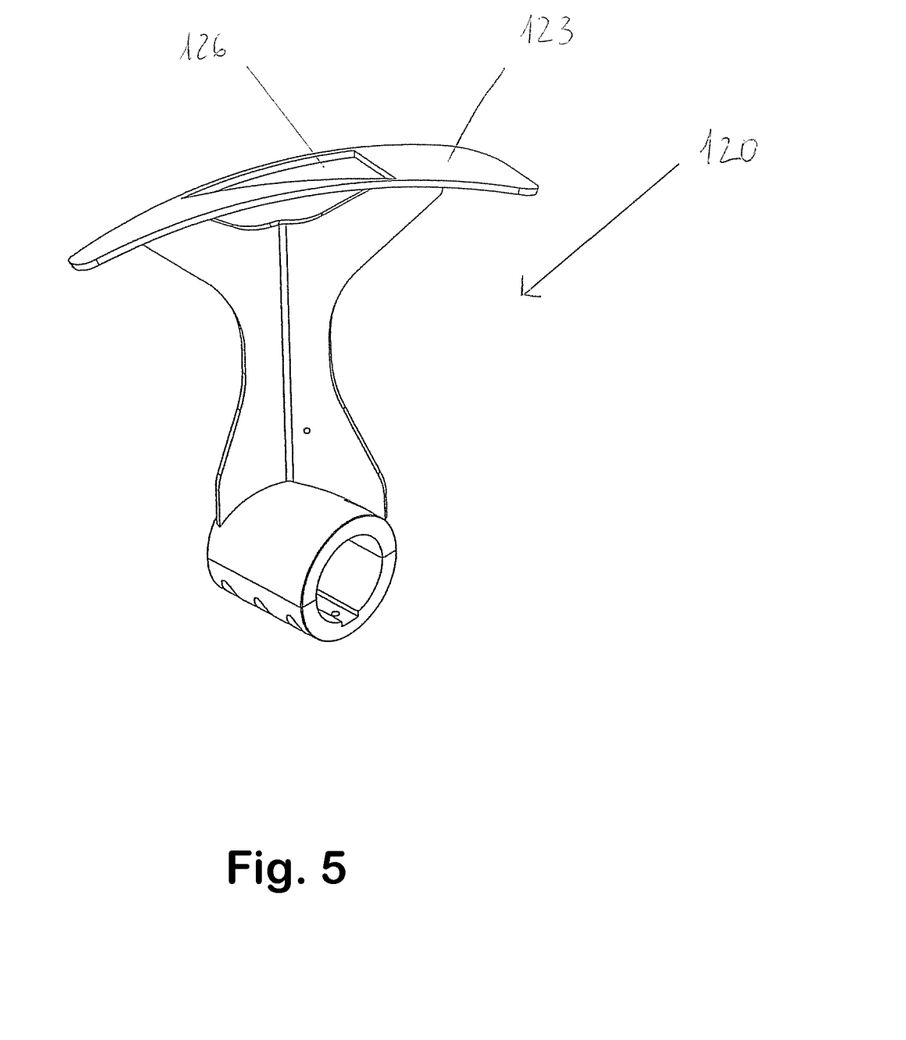
FIG. 5 shows a second embodiment of the shearing/mixing tool according to the invention in a perspective view.

FIG. 5 shows the second embodiment of the shearing/mixing tool according to the invention in a perspective view. In this exemplary embodiment, the second opening 126 has a triangular basic shape and therefore approximately follows the shape of the shearing/throwing blade 123.

Figure 6:
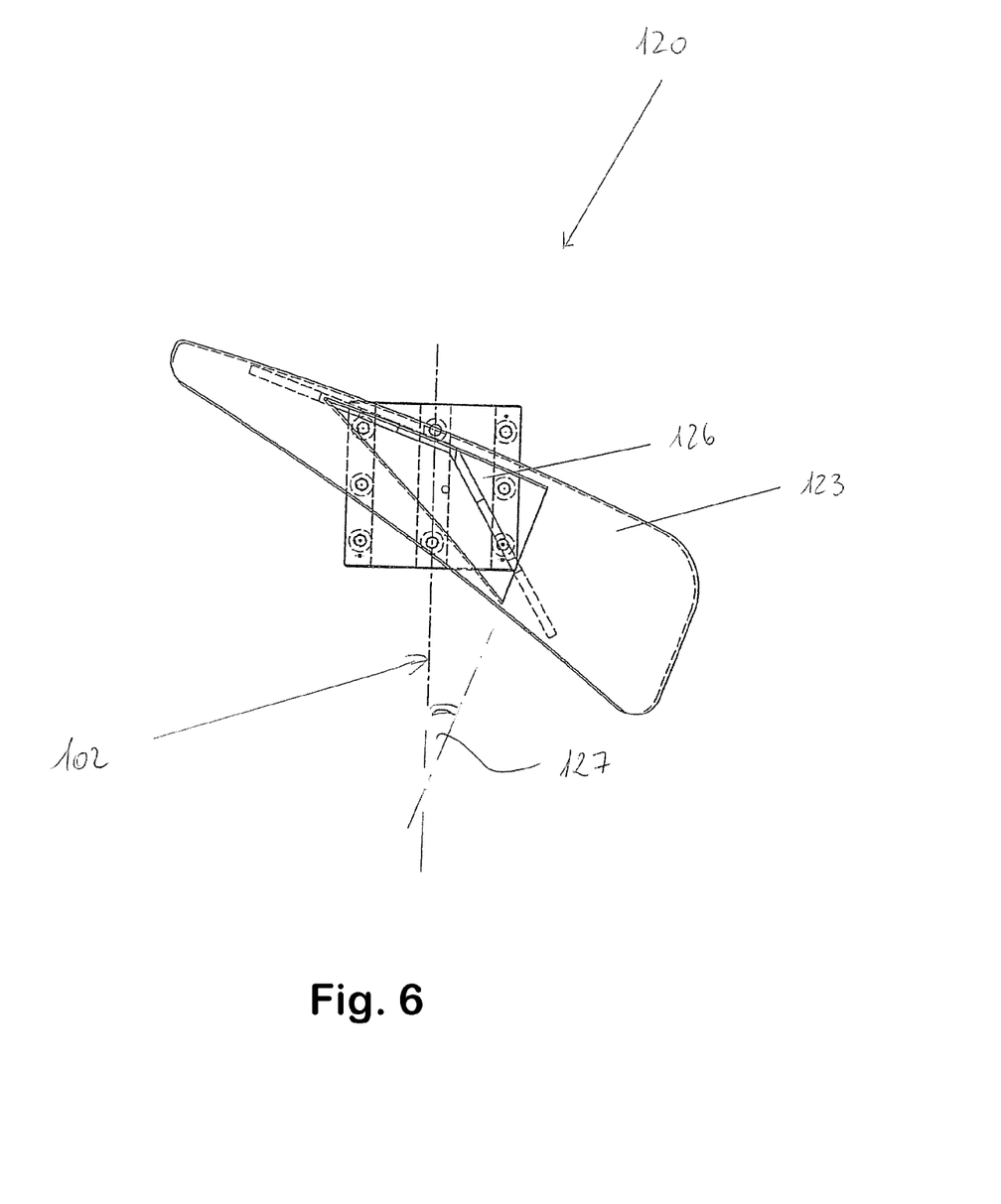
FIG. 6 shows a second embodiment of the shearing/mixing tool according to the invention in top view.

FIG. 6 shows the second embodiment of the shearing/mixing tool according to the invention in top view. It is clear that the shearing/throwing blade 123 and therefore also the opening 126 are pivoted by an angle 127 in relation to the shaft axis 102.

FIGS. 7a-7f show further embodiments of the shearing/mixing tool according to the invention in top view.

Figure 7A:
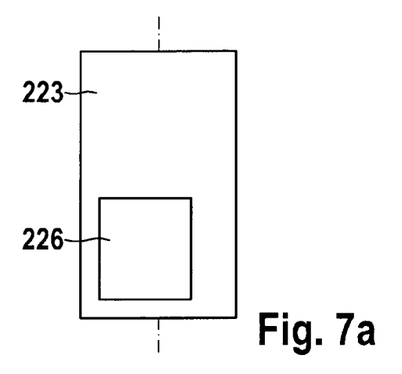
FIG. 7a-7f show further embodiments of the shearing/mixing tool according to the invention in top view.

FIG. 7a shows a shearing/throwing blade 223 with an asymmetrically arranged opening 226.

Figure 7B:
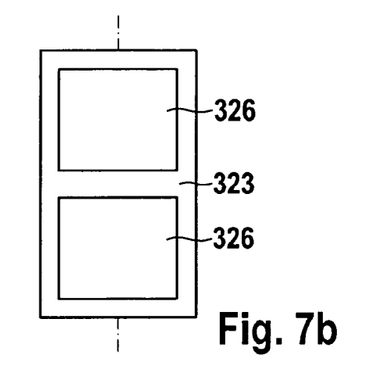

FIG. 7b shows a shearing/throwing blade 323 with a double opening 326.

Figure 7C:
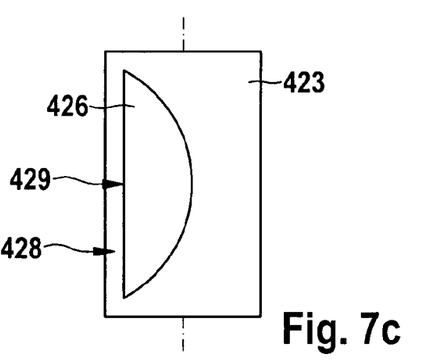
Figure 7D:
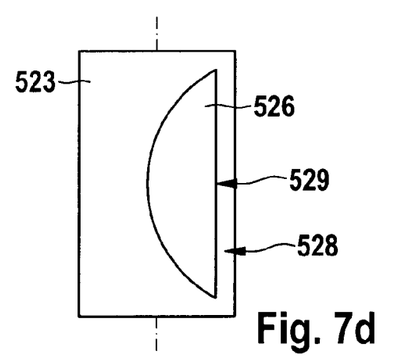

FIGS. 7c and 7d show shearing/throwing blades 423, 523 with openings which have rectilinear and rounded outer contours. The rectilinear edge 429 of the opening 426 can be arranged on that side 428 of the shearing/throwing blade 423 which is provided further away from the inside of the trough, or the rectilinear edge 529 can be provided on that side 528 of the shearing/throwing blade 523 which is closer to the inside of the trough.

Figure 7E:
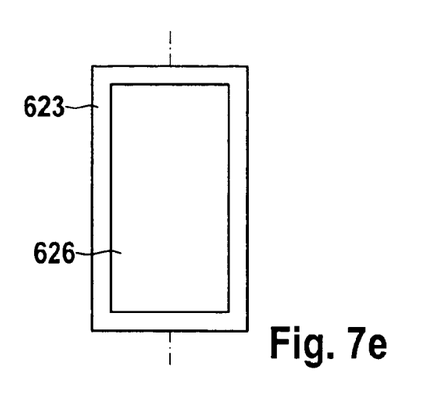

FIG. 7e shows a shearing/throwing blade 623 with a large opening 626. The latter can serve to receive an insert.

Figure 7F:
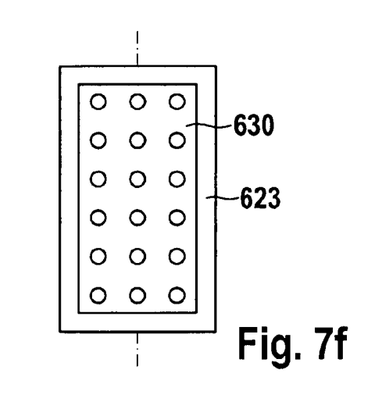

FIG. 7f shows the same shearing/throwing blade 623, wherein a perforated plate 630 is inserted in the opening 626.

Figure 8:
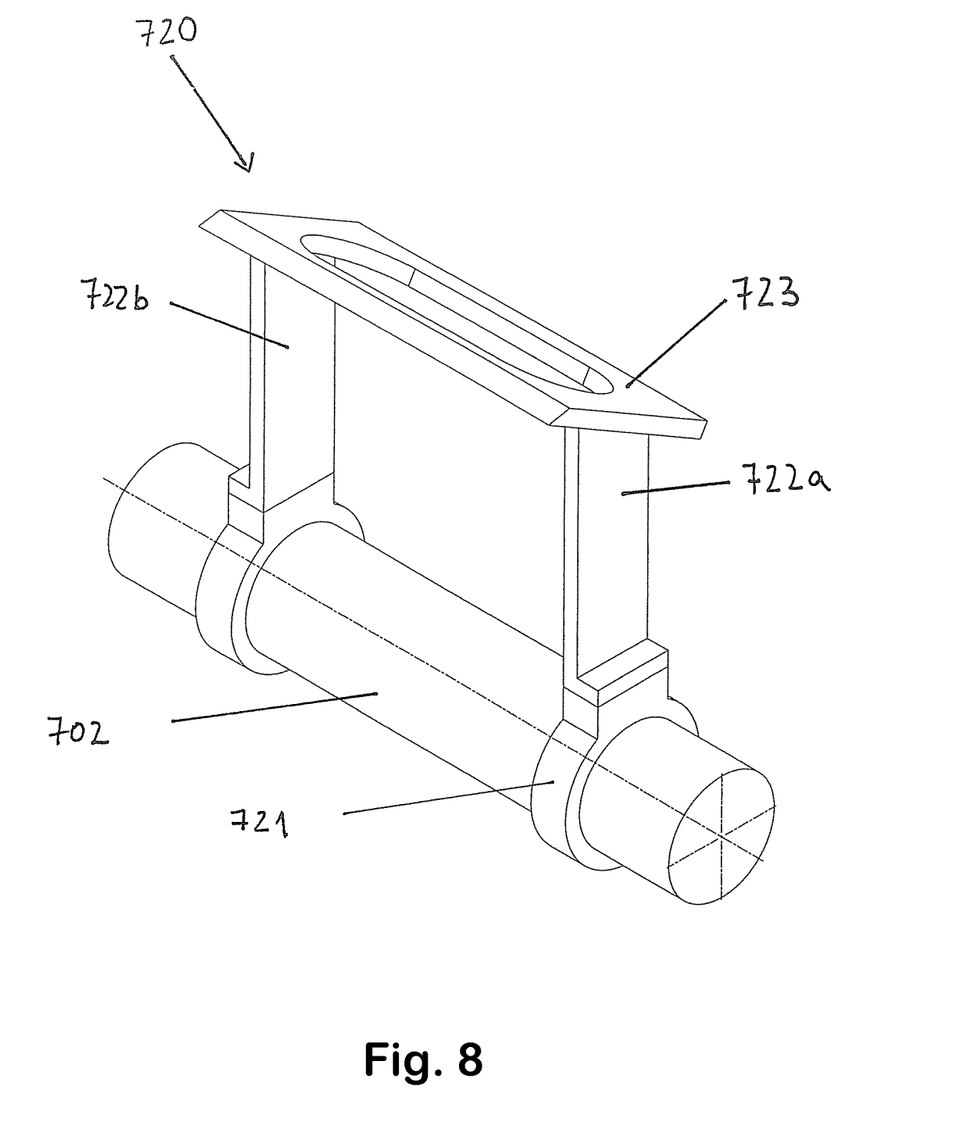
FIG. 8 shows a further exemplary embodiment of a shearing/mixing tool in a perspective view.

FIG. 8 shows a further exemplary embodiment of a shearing/mixing tool 720 in a perspective view. The shearing/throwing blade 723 is designed in the form of a plate which is held by two arms 722a, 722b. The arms 722a, 722b are fastened to the shaft 702 via annular fastening elements 721.

The invention claimed is:

1. A shearing/mixing tool, arrangeable on a shaft, which is mounted coaxially and rotatably in an at least partially cylindrical trough, and therefore the shearing/mixing tool forms a rotor arrangement with the shaft via a tool carrier, wherein the shearing/mixing tool comprises a shearing/throwing blade and at least one arm which is at least one of
   rectilinear,
   positioned obliquely and
   bent,
wherein
   the arm is connected to the shearing/throwing blade and the arm is designed to be fittable on a radial outer side of a tool carrier or to be integral therewith, such that the arm extends radially from the shaft when arranged on a shaft,
   the tool has at least one opening and wherein said at least one opening is provided between the arm and the shearing/throwing blade, wherein the opening is bounded only by the arm on one side of the opening and by the shearing/throwing blade on the other side of the opening,
   said at least one additional opening is provided in the shearing/throwing blade, and
   the arm is formed from a web plate which is Y-shaped and is turned on edge, or from a corresponding cast part.

2. The shearing/mixing tool as claimed in claim 1, wherein said at least one additional opening is provided in the arm.

3. The shearing/mixing tool as claimed in claim 1, wherein said at least one opening is triangular.

4. The shearing/mixing tool as claimed in claim 1, wherein the cross-sectional area of at least one opening is at least one of
   contracted and
   enlarged.

5. The shearing/mixing tool as claimed in claim 1, wherein a respective tool carrier in the form of annular fastening elements is provided at each axial end of at least one of a shearing/throwing blade and a wall scraper, such that said annular fastening elements are each arranged at a distance along the rotor axis of the shaft.

6. The shearing/mixing tool as claimed in claim 1, wherein the shearing/throwing blade is curved in the shape of an arc of a circle.

7. The shearing/mixing tool as claimed in claim 1, wherein the shearing/throwing blade comprises a spoon-shaped part and a sickle-shaped tip.

* * * * *